US011940395B2

(12) United States Patent
Bradshaw

(10) Patent No.: US 11,940,395 B2
(45) Date of Patent: Mar. 26, 2024

(54) ENCLOSED X-RAY CHOPPER WHEEL

(71) Applicant: VIDERAY TECHNOLOGIES, INC., Charlestown, MA (US)

(72) Inventor: Paul Bradshaw, Boston, MA (US)

(73) Assignee: Videray Technologies, LLC, Charlestown, MA (US)

( * ) Notice: Subject to any disclaimer, the term of this patent is extended or adjusted under 35 U.S.C. 154(b) by 50 days.

(21) Appl. No.: 17/631,949

(22) PCT Filed: Jul. 28, 2020

(86) PCT No.: PCT/US2020/043814
§ 371 (c)(1),
(2) Date: Feb. 1, 2022

(87) PCT Pub. No.: WO2021/025898
PCT Pub. Date: Feb. 11, 2021

(65) Prior Publication Data
US 2022/0283103 A1    Sep. 8, 2022

Related U.S. Application Data

(60) Provisional application No. 62/882,398, filed on Aug. 2, 2019.

(51) Int. Cl.
*G01N 23/203* (2006.01)
*G01V 5/222* (2024.01)
*G21K 1/04* (2006.01)

(52) U.S. Cl.
CPC .......... *G01N 23/203* (2013.01); *G01V 5/222* (2024.01); *G21K 1/043* (2013.01); *G01N 2223/314* (2013.01)

(58) Field of Classification Search
CPC ........ G21K 1/04; G21K 1/043; G01N 23/203; G01V 5/0025

(Continued)

(56) References Cited

U.S. PATENT DOCUMENTS

| 4,799,247 A | * | 1/1989 | Annis | ..................... G21K 5/10 378/57 |
| 5,022,062 A | * | 6/1991 | Annis | ................. G01V 5/0025 378/57 |

(Continued)

OTHER PUBLICATIONS

International Search Report and Written Opinion, dated Oct. 20, 2020, for corresponding International Application No. PCT/US2020/043814.

*Primary Examiner* — Allen C. Ho
(74) *Attorney, Agent, or Firm* — BUILD IP, LLC; Robert V. Donahoe

(57) ABSTRACT

A chopper wheel assembly includes a collimator configured to narrow an x-ray beam, a chopper wheel has a planar surface configured to face in a direction of the collimator and a housing configured to receive the chopper wheel. The chopper wheel includes a central axis, a plurality of slits in the planar surface, a first projection extending from the planar surface in a direction of the collimator and a second projection extending from the planar surface in the direction of the collimator. The slits extend in radially-outward direction relative to the central axis. The first projection is located radially outward of the plurality of slits and the second projection is located radially inward of the plurality of slits. Each projection is provided for 360 degrees about the central axis. The housing includes an interior wall including a first groove configured to receive the first projection and a second groove configured to receive the second projection with the chopper wheel received within the housing.

17 Claims, 7 Drawing Sheets

(58) Field of Classification Search
USPC ................. 378/57, 86–90, 149–151, 160
See application file for complete search history.

(56) References Cited

U.S. PATENT DOCUMENTS

| | | | | |
|---|---|---|---|---|
| 5,044,002 A * | 8/1991 | Stein | ............... | H05G 1/46 378/57 |
| 5,181,234 A * | 1/1993 | Smith | ............... | G01V 5/0025 378/146 |
| 5,224,144 A * | 6/1993 | Annis | ............... | G01V 5/0016 378/146 |
| 5,493,596 A * | 2/1996 | Annis | ............... | G01N 23/10 378/146 |
| 5,666,393 A * | 9/1997 | Annis | ............... | G01N 23/04 378/98.2 |
| 6,151,381 A * | 11/2000 | Grodzins | ............... | G01V 5/0041 378/57 |
| 6,192,104 B1 * | 2/2001 | Adams | ............... | G01N 23/203 378/57 |
| 6,249,567 B1 * | 6/2001 | Rothschild | ............... | G01N 23/20 378/86 |
| 6,434,219 B1 * | 8/2002 | Rothschild | ............... | G21K 1/04 378/160 |
| 6,442,233 B1 * | 8/2002 | Grodzins | ............... | G01N 23/201 378/57 |
| 6,453,007 B2 * | 9/2002 | Adams | ............... | G01N 23/203 378/146 |
| 6,459,761 B1 * | 10/2002 | Grodzins | ............... | G01N 23/20 378/57 |
| 6,459,764 B1 * | 10/2002 | Chalmers | ............... | G01V 5/0025 378/86 |
| 6,621,888 B2 * | 9/2003 | Grodzins | ............... | G01V 5/0025 378/57 |
| 7,623,614 B2 * | 11/2009 | Shefsky | ............... | G01T 1/295 378/87 |
| 7,796,734 B2 * | 9/2010 | Mastronardi | ............... | G01V 5/0025 378/146 |
| 7,826,589 B2 * | 11/2010 | Kotowski | ............... | G01V 5/0025 378/57 |
| 7,965,816 B2 * | 6/2011 | Kravis | ............... | G01V 5/0016 378/57 |
| 7,983,391 B2 * | 7/2011 | Machan | ............... | A61B 6/06 378/98.2 |
| 8,199,996 B2 * | 6/2012 | Hughes | ............... | G01V 5/0025 378/90 |
| 8,437,451 B2 * | 5/2013 | Van Lemel | ............... | G21K 1/04 378/70 |
| 8,576,989 B2 * | 11/2013 | Kaminski | ............... | G01V 5/0025 378/160 |
| 8,761,338 B2 * | 6/2014 | Safai | ............... | G01N 23/203 378/197 |
| 8,879,688 B2 * | 11/2014 | Safai | ............... | G01N 23/20008 378/86 |
| 8,908,831 B2 * | 12/2014 | Bendahan | ............... | G01V 5/0041 378/86 |
| 8,989,352 B2 * | 3/2015 | Laws | ............... | A61B 6/06 378/150 |
| 8,995,619 B2 * | 3/2015 | Gray | ............... | G01V 5/0025 378/57 |
| 9,014,339 B2 * | 4/2015 | Grodzins | ............... | G21K 1/043 378/146 |
| 9,020,103 B2 * | 4/2015 | Grodzins | ............... | G21K 1/046 378/146 |
| 9,036,781 B1 * | 5/2015 | Safai | ............... | G01N 23/00 378/86 |
| 9,052,271 B2 * | 6/2015 | Grodzins | ............... | G02B 27/30 |
| 9,090,974 B2 * | 7/2015 | Yamaguchi | ............... | C23C 14/50 |
| 9,117,564 B2 * | 8/2015 | Rommel | ............... | G21K 1/08 |
| 9,146,201 B2 * | 9/2015 | Schubert | ............... | G01N 23/203 |
| 9,194,827 B2 * | 11/2015 | Kang | ............... | G01N 23/203 |
| 9,557,284 B2 * | 1/2017 | Vogler | ............... | G01N 21/59 |
| 9,739,727 B2 * | 8/2017 | Safai | ............... | G01N 23/203 |
| 10,102,937 B2 * | 10/2018 | Carpenter | ............... | G21K 1/087 |
| 10,151,716 B2 * | 12/2018 | Belcher | ............... | G01T 3/00 |
| 10,168,445 B2 * | 1/2019 | Morton | ............... | G01V 5/0066 |
| 10,172,573 B2 * | 1/2019 | Öjelund | ............... | H04N 23/81 |
| 10,327,717 B2 * | 6/2019 | Melman | ............... | A61B 6/4225 |
| 10,481,113 B2 * | 11/2019 | Arodzero | ............... | G01V 5/0066 |
| 10,656,304 B2 * | 5/2020 | Grodzins | ............... | G01V 5/0025 |
| 10,720,300 B2 * | 7/2020 | Rommel | ............... | H01J 35/147 |
| 10,754,057 B2 * | 8/2020 | Bendahan | ............... | G21K 1/04 |
| 10,762,998 B2 * | 9/2020 | Rothschild | ............... | G01V 5/0025 |
| 10,770,195 B2 * | 9/2020 | Rothschild | ............... | G21K 1/04 |
| 10,794,843 B2 * | 10/2020 | Rothschild | ............... | G01V 5/0025 |
| 11,112,370 B2 * | 9/2021 | Safai | ............... | G01N 23/20008 |
| 11,525,929 B2 * | 12/2022 | Rothschild | ............... | G01T 1/203 |
| 2012/0177180 A1 | 7/2012 | Van Lemel et al. | | |
| 2013/0048489 A1 | 2/2013 | Yamaguchi et al. | | |
| 2017/0358380 A1 | 12/2017 | Rothschild | | |
| 2018/0294066 A1 | 10/2018 | Rothschild | | |

\* cited by examiner

ENCLOSED X-RAY CHOPPER WHEEL

BACKGROUND OF INVENTION

1. Field of Invention

This invention relates generally to x-ray backscatter instruments. More specifically, at least one embodiment, relates to an x-ray backscatter instrument with an enclosed chopper wheel.

2. Discussion of Related Art

Backscatter x-ray imaging is often employed in security screening to detect contraband located in regions that are hidden from view, for example, hidden behind a solid metal panel in the body of a car or truck. In general, the approach includes an instrument that directs a relatively narrow beam of x-rays at the solid surface. The x-ray energy passes through the surface and reflects or scatters off any item(s) on the far side of the surface. The instrument creates an image of the items using the x-rays that are reflected or scattered from the item(s).

Shielding is included in x-ray backscatter instruments to improve safety for the instrument-operators and those in the immediate vicinity of the instruments when used. Early x-ray backscatter instruments were generally large, heavy pieces of equipment installed at a fixed location or moved with aid of a wheeled cart. However, today's instruments are often provided in a portable hand-held form factor. These handheld instruments provide additional challenges for shielding because the operator is in close proximity to the instrument when it is producing x-ray energy.

In general, x-ray backscatter instruments include an x-ray source, a collimator used to narrow the x-ray beam generated by the x-ray source and a chopper wheel housed within a housing. These are optical components that take the x-rays generated by the tube and focus them into a beam that is functional for scanning. The housing is manufactured from material known to provide x-ray shielding. A drive motor is coupled to the chopper wheel to rotate the wheel when x-ray energy is being produced by the instrument. The chopper wheel includes a set of slits that used to create a smaller "pencil beam" of x-ray energy from the x-ray energy received via the collimator. Typically, four slits are located at ninety degree intervals around the chopper wheel.

In practice, it is impractical to construct x-ray backscatter instruments with enough shielding to completely eliminate the x-ray energy that escapes from the instrument. Instead, instruments are designed to meet OSHA regulations that allow operators to use x-ray instruments provided the operator does not receive x-ray energy in an amount that exceeds an established safety threshold over a given period of time. In some cases, operation that creates exposure greater than that threshold is permissible under the regulations, but only if the individual has completed certified radiation training.

Referring now to FIG. 1, a cross section of a chopper wheel assembly 100 is illustrated in accordance with the prior art. The chopper wheel assembly 100 includes a collimator 120, a chopper wheel 122, a housing 124 and a motor 126 including a hub 132. The chopper wheel 122 includes a source-side surface 128. The housing 124 includes an interior surface 130, a source-side x-ray opening 134 and a target-side x-ray opening 136. The motor 126 is coupled to the chopper wheel 122 at the hub 132. The cross section illustrates the chopper wheel at a degree of rotation that does not place any of the four slits (not illustrated) adjacent the source-side x-ray opening 134 and the target-side x-ray opening 136.

In operation, x-ray energy is provided by an x-ray source (not illustrated) located to the left of the chopper wheel assembly 100. The x-ray energy is directed at the collimator 120 which acts to narrow the x-ray beam that is directed at the chopper wheel 122. The beam reaches the chopper wheel 122 via the source-side opening 134. The chopper wheel 122 is rotating at a speed such that, for a known period during each rotation, one of the slits is at least partially aligned with source side opening 134, and at the same time, the target-side opening 136. When the slits are at least partially aligned with the openings, 134, 136 the collimated beam enters the source-side opening 134 passes through the slit and exits the housing 124 via the target-side opening 136.

The size of the slits is relatively small when compared with the overall surface area of the solid regions of the chopper wheel 122. As a result, a solid region of the chopper wheel 122 is located between the source side opening 134 and the target-side opening 136 for the majority of each revolution of the chopper wheel 122. X-ray energy scatters off the portions of the chopper wheel 122 when the solid region of the chopper wheel 122 rotates in front of the source side opening 134. The x-ray scatters in an isotropic manner off the interior surface 130 into the region located between the source-side surface 128 and the interior surface 130. Thus, the scattered x-ray energy can travel in directions ranging from those normal to the source-side surface 128 to those that are substantially parallel to the source-side surface 128. That is, x-ray energy can travel radially outward in the region between the planar source-side surface 128 and the planar interior surface 130 such that the energy is directed to the outside radius of the housing 124.

Tungsten and tungsten alloys are common shielding materials because they have a high density, they machine well and have desirable x-ray shielding properties due to the high atomic number of tungsten. However, tungsten is an expensive specialty metal. Regardless, prior approaches generally manufacture the housing 124 from tungsten or tungsten alloys because they are effective at shielding significant amounts of the x-ray energy scattered off the chopper wheel 122 in this manner.

SUMMARY OF INVENTION

Therefore, there is a need for apparatus, systems and methods to provide an enclosed chopper wheel design that reduces the scattered x-ray energy that reaches the housing of a chopper wheel to allow more common material to provide the chopper wheel housing. According to some embodiments, a chopper wheel and associated housing include structural features that provide a labyrinth design that increases x-ray energy attenuation of x-rays scattered from the chopper wheel before the x-ray energy reaches the housing of the chopper wheel. In some embodiments, projections located at a radial inner location and a radial outer location on the chopper wheel, respectively, are received by grooves in the chopper wheel housing. In one embodiment, the chopper wheel and integral projections are manufactured from tungsten or a tungsten alloy. According to this embodiment, the chopper wheel provides one-piece attenuation such that the housing is manufactured from brass or another material having a lower atomic number than tungsten while still substantially reducing x-ray energy transmitted outside the housing.

According to one aspect a chopper wheel assembly configured for use with a source of x-ray energy is provided. The chopper wheel assembly includes a collimator configured to narrow an x-ray beam generated by the source of x-ray energy, a chopper wheel having a planar surface configured to face in a direction of the collimator and a housing including a hollow interior region configured to receive the chopper wheel. According to one embodiment, the chopper wheel includes a central axis, a plurality of slits in the planar surface, a first projection extending from the planar surface in a direction of the collimator and a second projection extending from the planar surface in the direction of the collimator. In further embodiments, the slits extend in radially-outward direction relative to the central axis, the first projection is located radially outward of the plurality of slits and provided for 360 degrees about the central axis and the second projection is located radially inward of the plurality of slits and provided for 360 degrees about the central axis. Further, the housing includes an interior wall facing toward the chopper wheel and away from the direction of the collimator, the interior wall including a first groove configured to receive the first projection and a second groove configured to receive the second projection with the chopper wheel received within the housing.

According to another aspect, a handheld backscatter x-ray imaging system includes an outer housing with a plurality of handles, a display screen located in the outer housing and viewable with the system held with the plurality of handles, a source of x-ray energy configured to generate an x-ray beam, a collimator configured to narrow the x-ray beam, and a chopper wheel having a surface configured to face in a direction of the collimator. According to one embodiment, the display screen is configured to display an x-ray image and the source of x-ray energy is located within the outer housing. According to a further embodiment, the chopper wheel includes a central axis, a plurality of slits extending through the chopper wheel in radially-outward direction relative to the central axis, a first projection extending from the surface in a direction of the collimator, the first projection located radially outward of the plurality of slits and provided for 360 degrees about the central axis and a second projection extending from the planar surface in the direction of the collimator, the second projection located radially inward of the plurality of slits and provided for 360 degrees about the central axis. According to an alternate embodiment, the handheld backscatter x-ray imaging system includes an outer housing that only provides a single handle, for example, in an outer enclosure with a shape similar to a radar gun.

According to yet another aspect, a method of attenuating x-ray energy generated during an operation of a backscatter imaging system configured to generate a collimated beam of x-ray energy is provided. According to one embodiment, the method includes providing a chopper wheel including an inner rim and an outer rim, the chopper wheel configured to rotate in a plane to periodically interrupt the collimated beam of x-ray energy directed substantially perpendicular to the plane, the interruption generating scattered x-ray energy in directions including a direction substantially parallel to the plane of the chopper wheel; enclosing the chopper wheel in a housing with a gap between the chopper wheel and an interior surface of the housing, the gap substantially parallel to the plane of the chopper wheel; including a first projection at the outer rim of the chopper wheel, the first projection extending into the gap in a direction perpendicular to the plane; and including a second projection at the inner rim of the chopper wheel, the second projection extending into the gap in the direction perpendicular to the plane.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
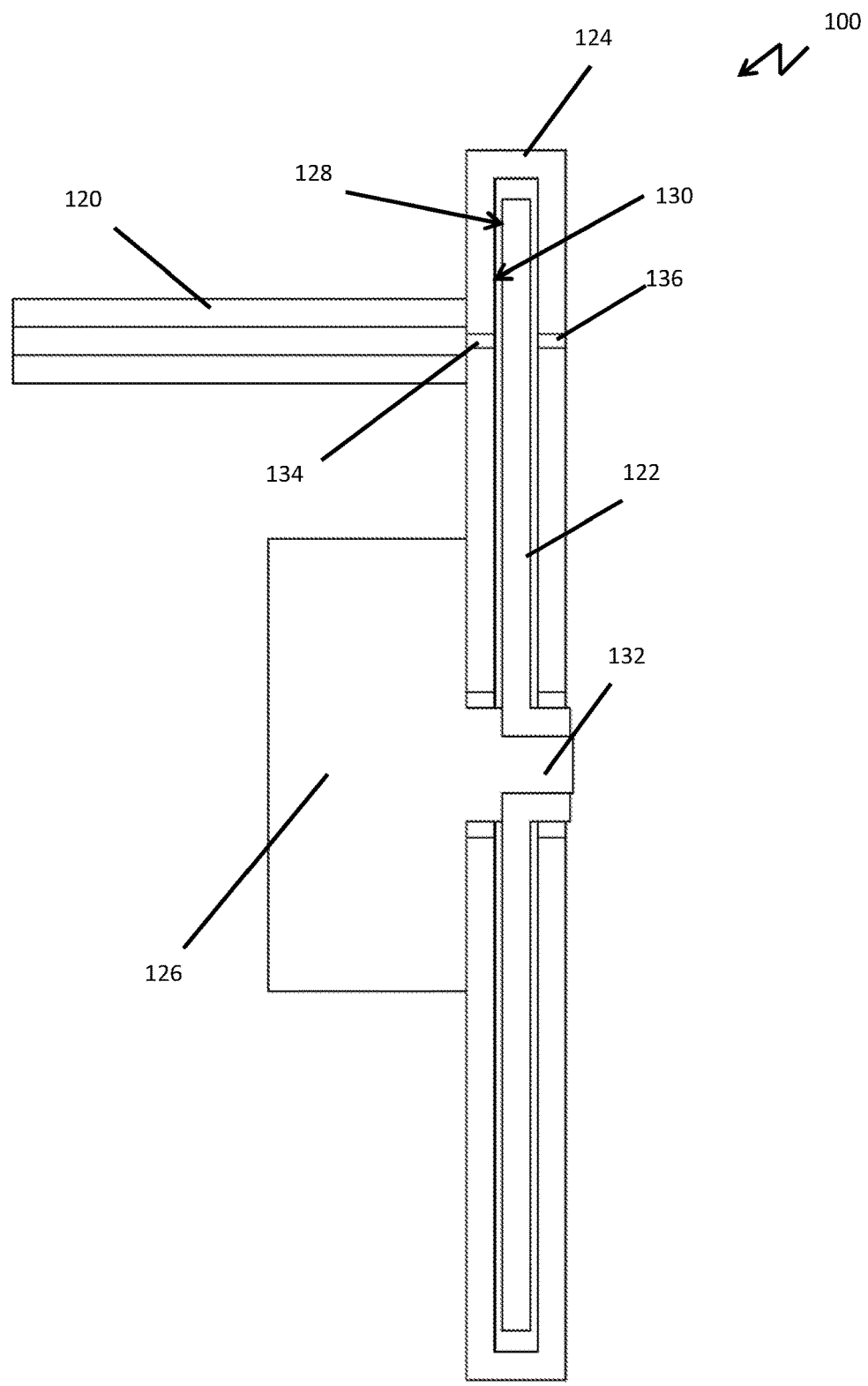
FIG. 1 illustrates elements included in an x-ray backscatter instrument in accordance with the prior art.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Figure 2:
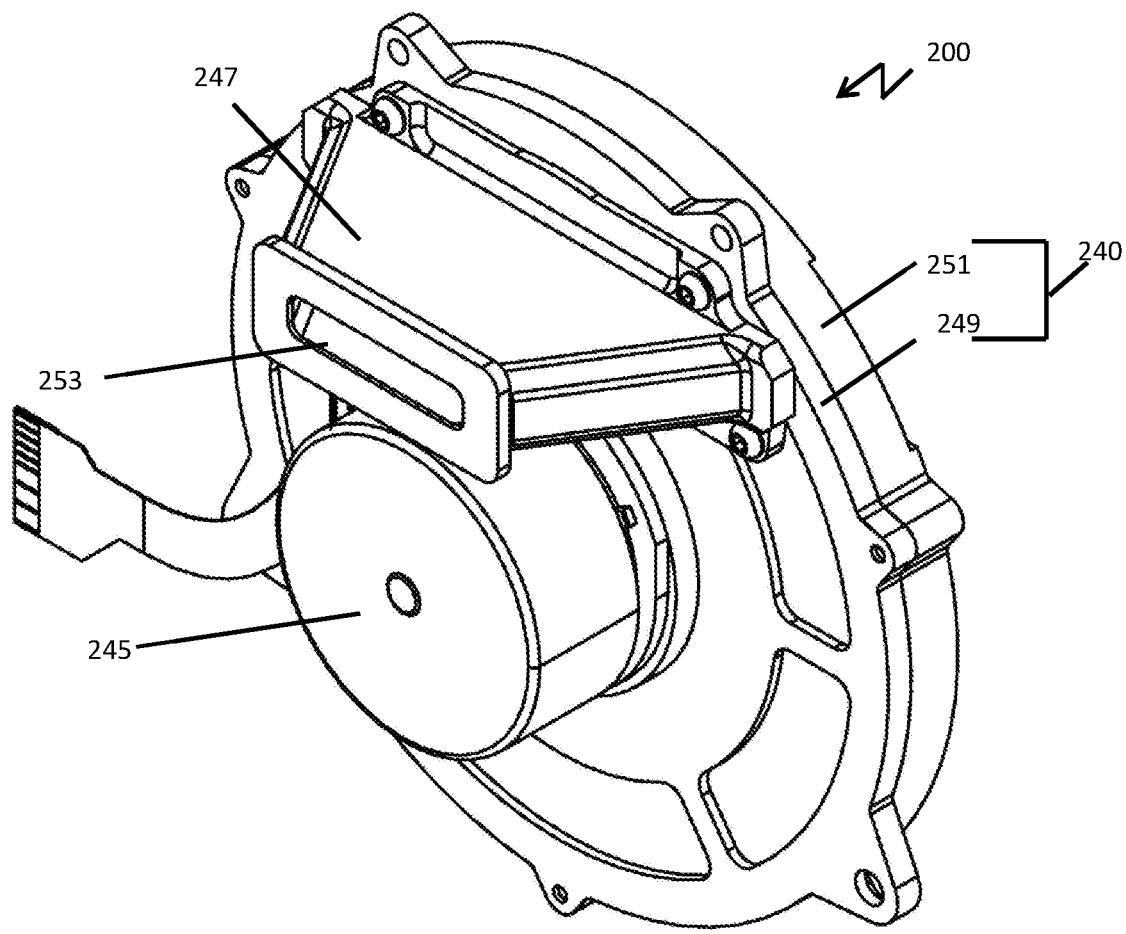
FIG. 2 illustrates an isometric view of a chopper wheel assembly in accordance with one embodiment.

Referring now to FIG. 2, a chopper wheel assembly 200 is illustrated in accordance with some embodiments. The chopper wheel assembly 200 includes a housing 240, a drive motor 245, and a pre-collimator 247. The housing 240 includes a source-side housing 249 and a target-side housing 251. The pre-collimator 247 includes a source-side opening 253. A chopper wheel is located within the housing 240 as is described below and illustrated in FIG. 3. In some embodiments, the chopper wheel assembly 200 is included in a hand-held backscatter instrument. An x-ray source including an x-ray anode is also included in the instrument. In operation, the output of the x-ray source is directed to the source-side opening 253 where the x-ray energy enters the pre-collimator 247 where it is directed into the housing 240.

According to the illustrated embodiment, the housing 240 is assembled by fastening the source-side housing 249 to the target-side housing 251, for example, using screws, bolts or other fastening hardware. The housing 240 can be manufactured from any of a variety of metals that are at least somewhat effective in blocking x-ray energy to provide shielding. According to some embodiments, the housing 240 is manufactured from brass. The advantages of using brass include a lower cost and lighter weight relative to tungsten. As is described in greater detail below, various embodiments of the chopper wheel assembly 200 include features added to the chopper wheel to increase the overall effectiveness of the shielding without the need for the housing 240 to be manufactured from a more costly material with a higher atomic number such as tungsten.

According to the illustrated embodiment, the pre-collimator 247 is attached to an exterior surface of the source-side housing 249. It is also desirable to manufacture the pre-collimator 247 from material that provides shielding. According to various embodiments, the pre-collimator 247 is manufactured from tungsten or a tungsten alloy.

According to some embodiments, the motor 245 is a brushless DC motor. In one embodiment, the motor is a Maxon EC32 FL.

Figure 3:
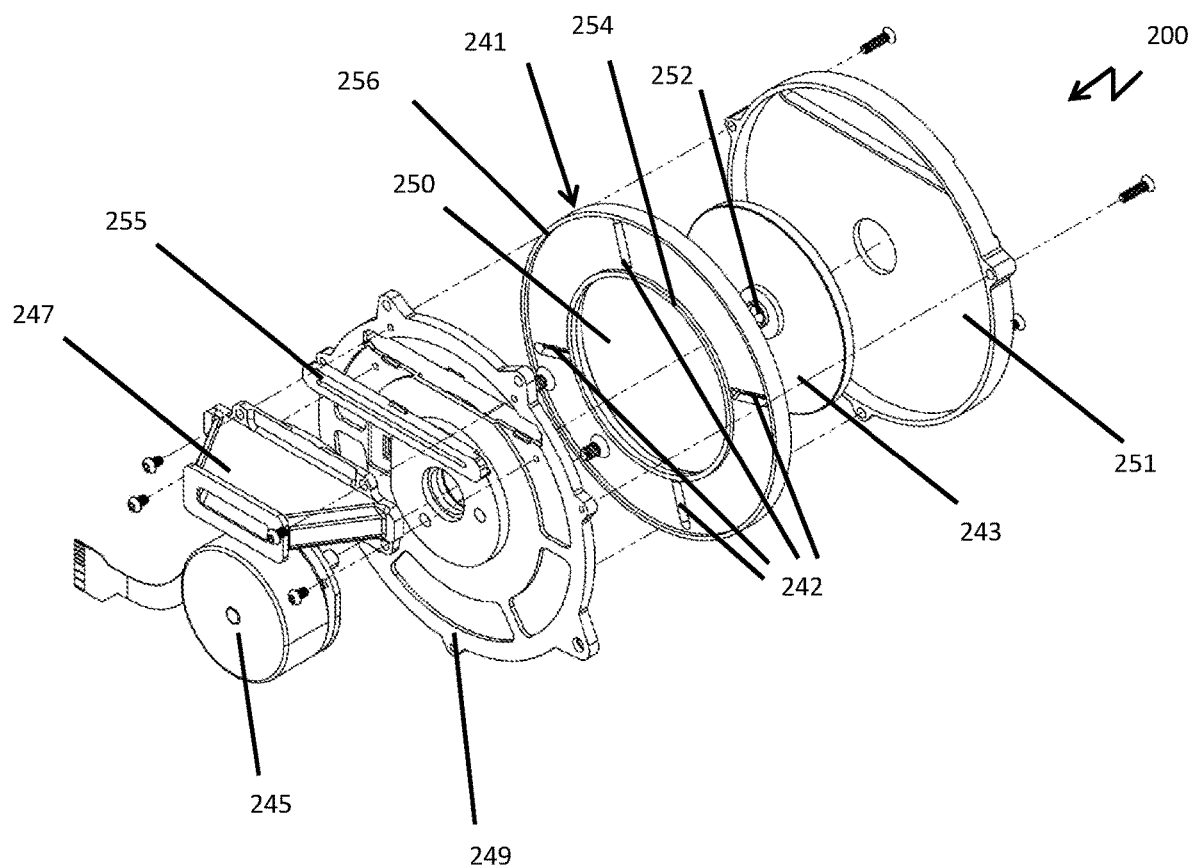
FIG. 3 illustrates an exploded view of the chopper wheel assembly of FIG. 2 in accordance with one embodiment.

Referring now to FIG. 3, an exploded view of the chopper wheel assembly 200 of FIG. 2 is illustrated. The exploded view illustrates a chopper wheel 241, a hub 243 and a line collimator 255 that are located in the housing 240 when the chopper wheel assembly 200 is fully assembled. The chopper wheel 241 has an overall ring-like shape defined by an inner circumference 246 and an outer circumference 248. The inner circumference 246 defines an opening 250 having a diameter D1 (illustrated in FIG. 4) in a central region of the chopper wheel 248. The hub 243 includes a solid disk-like shape and a central opening 252. The outside diameter of the hub 243 is sized such that the hub 243 is located within the opening 250 and attached to the chopper wheel 241 at the inner circumference 246. The central opening 252 is sized to receive a shaft included in the motor 245. In operation, the motor 245 drives the hub 243 to rotate the hub 243 and the chopper wheel 241.

The line collimator 255 is employed to further form the beam of x-ray energy after it enters the housing 240 and before reaching the chopper wheel 241. According to the illustrated embodiment, the line collimator 255 is secured within an opening in the source-side housing 249 such that it is aligned with the pre-collimator 247. According to another embodiment, the line collimator 255 is attached to an interior surface of the source-side housing 249. It is also desirable to manufacture the line collimator 255 from material that provides shielding. According to various embodiments, the line collimator 255 is manufactured from tungsten or a tungsten alloy.

A plurality of slits 242 are located within the chopper wheel 241. According to the illustrated embodiments, the slits 242 are spaced at 90 degree intervals and extend radially a majority of the distance between the inner circumference 246 and the outer circumference 248 of the chopper wheel 241.

The chopper wheel includes an inner projection 254 and an outer protection 256 extending from the chopper wheel 241. Each projection 254, 256 extends axially from the surface in a direction of the source-side housing 249. In the illustrated embodiment, the inner projection 254 is located adjacent the inner circumference 246 and outer projection 256 is located adjacent the outer circumference 248 of the chopper wheel 241 each located for 360 degrees about the axis of the chopper wheel.

Figure 4:
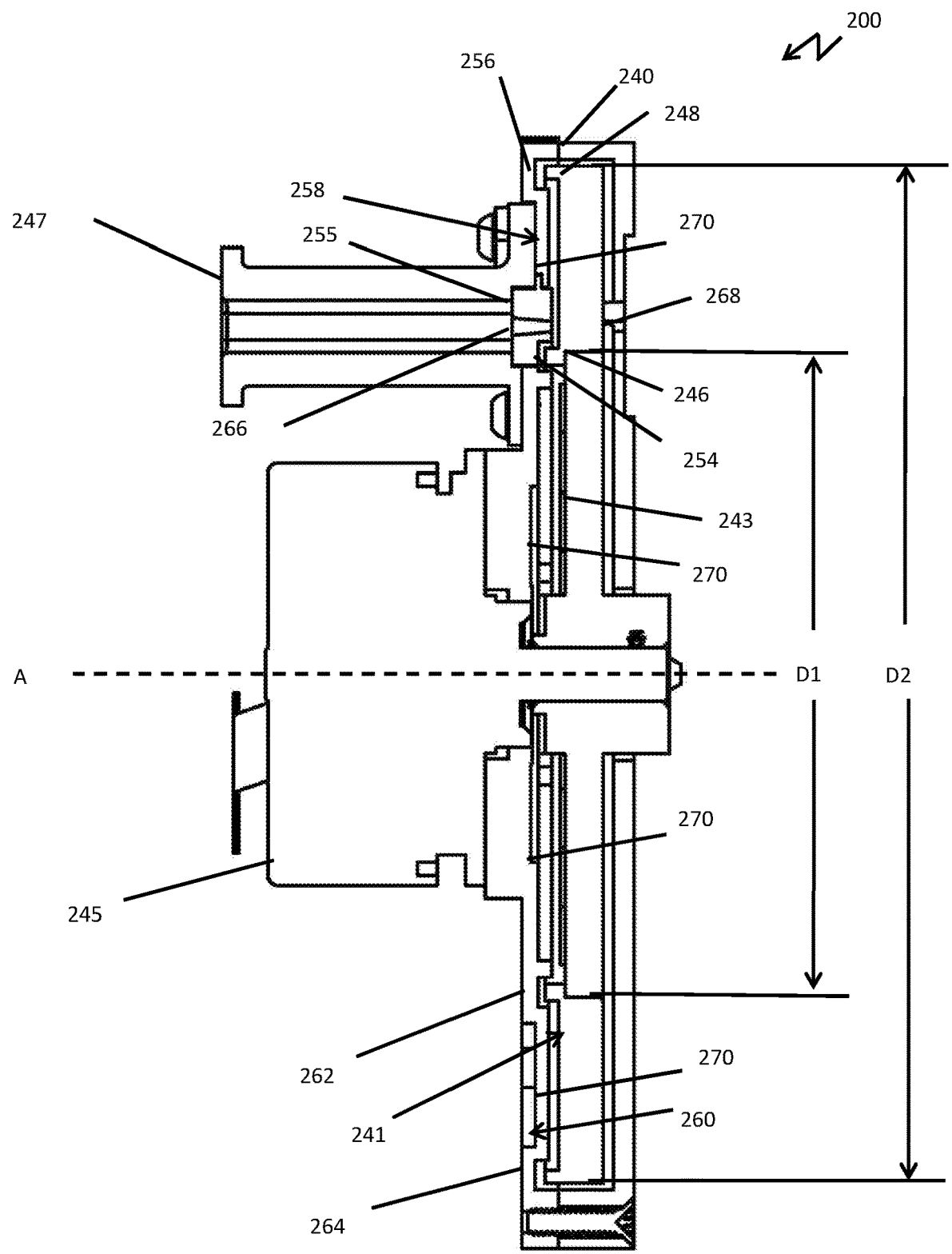
FIG. 4 illustrates a cross sectional view of the chopper wheel assembly of FIG. 2 in accordance with one embodiment with the cross section located in a vertical plane through the center of the chopper wheel assembly.

Referring now to FIG. 4, a cross-sectional view of the chopper wheel assembly 200 is illustrated in accordance with one embodiment. FIG. 4 illustrates the first diameter D1 and a second diameter D2. According to the illustrated embodiment, the second diameter D2 is an outer diameter of the chopper wheel 241. The cross-sectional view illustrates a planar surface 258 located on source-side of the chopper wheel 241. The inner projection 254 and the outer projection 256 extend substantially perpendicular from the planar surface 258 in the direction of the source-side housing 249. The inner projection 254 is located at a first radius relative to the axis A. The outer projection 256 is located at a second radius with the second radius larger than the first radius. According to the illustrated embodiment, the inner projection 254 defines and inner rim and the outer projection 256 defines an outer rim of the chopper wheel 241.

An inner surface 260 of the source-side housing 249 is also illustrated in FIG. 4. An inner groove 262 and an outer groove 264 are provided in the inner surface 260. According to the illustrated embodiment, the grooves 262, 264 have a circular shape that extends annularly for 360 degrees about the axis A. The inner groove 262 is located at a first radius relative to the axis A. The outer groove 264 is located at a second radius with the second radius larger than the first radius. The inner groove 262 is located such that it is aligned with the inner projection 254. Similarly, the outer groove 264 is located such that it is aligned with the outer projection 256. That is, the inner projection 254 is located at the same radius as the inner groove 262 and the outer projection 256 is located at the same radius as the outer groove 264.

The housing 240 also includes a source-side opening 266 and a target-side opening 268. According to the illustrated embodiment, the pre-collimator 247 is aligned in the source-side opening 266 and the line collimator 255 is aligned with the target-side opening 268. As illustrated in FIG. 4, the chopper wheel is at a point in its rotation about the axis A such that none of the plurality of slits 242 is located in the plane of the cross section. At this stage of chopper-wheel rotation, the path for the x-ray energy is blocked between the pre-collimator 247 and the line collimator 255, i.e., between the source-side opening 266 and the target-side opening 268.

Figure 5:
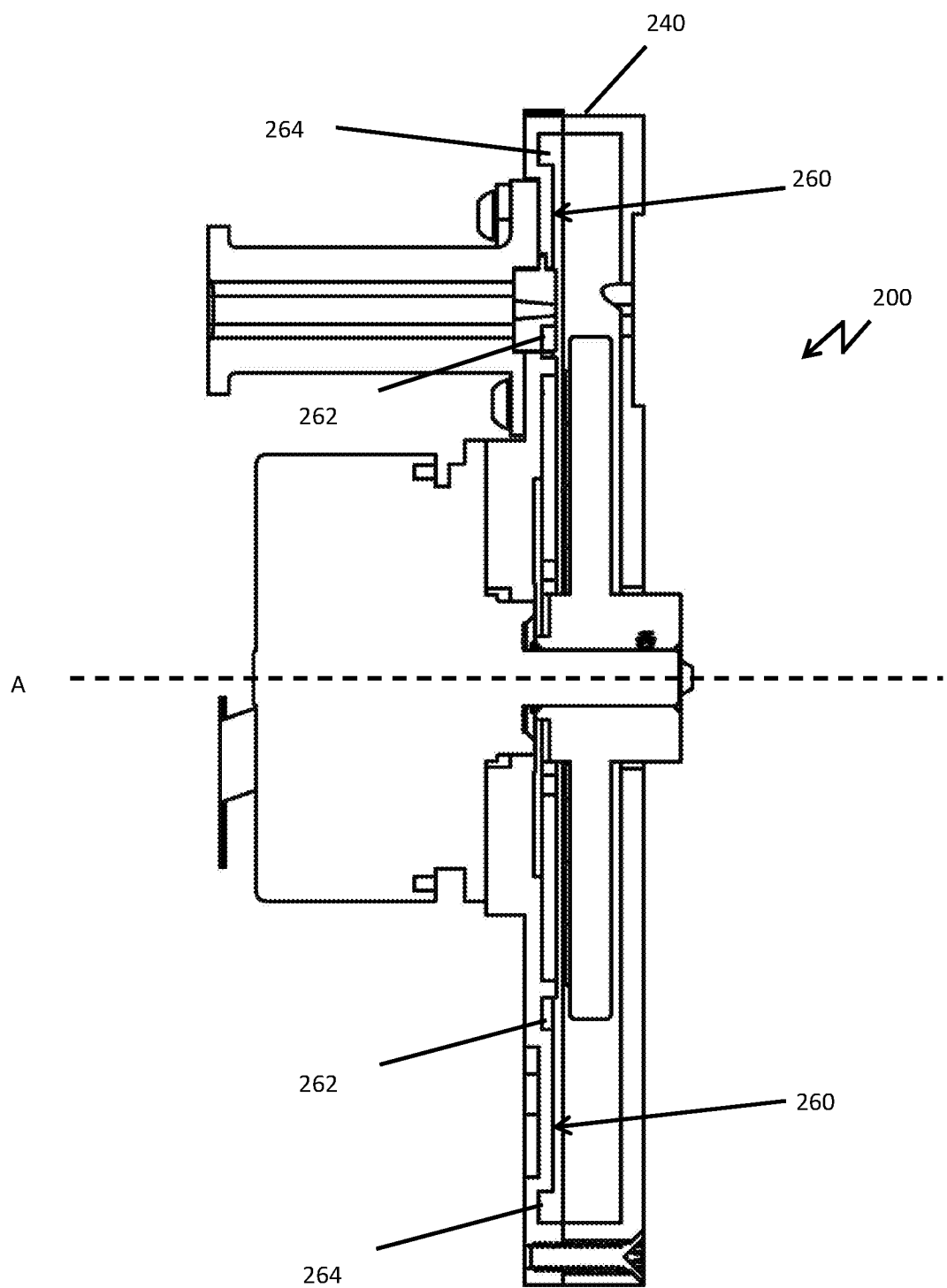
FIG. 5 illustrates the cross sectional view of FIG. 4 with the chopper wheel removed in accordance with one embodiment.

Referring now to FIG. 5, a cross-sectional view of the chopper wheel assembly 200 is illustrated with the chopper wheel removed in accordance with one embodiment. FIG. 5 illustrates the inner surface 260 located on a source-side interior wall of the housing 240. According to the illustrated embodiment, the inner surface 260 includes generally planar regions that step up as the radial distance from the axis A increases. In one embodiment, the grooves 262, 264 are machined into the planar region at each of the first radius and the second radius. As illustrated in FIG. 4, the inner groove 262 and the outer groove 264 are sized and located to receive the inner projection 254 and the outer projection 256 in the fully assembled chopper wheel assembly 200.

Referring again to FIG. 4, a gap 270 extends in an overall radial direction from near the axis A to the outside edge of the housing 240. However, when the chopper wheel assembly 200 is assembled, the gap 270 extends in an axial direction immediately adjacent both the inner projection 254 and the outer projection 256. This geometry effectively provides an obstruction in the overall radial path of the gap 270. In various embodiments, the projections 254, 256 are machined as an integral part of the chopper wheel 241. As a result, the projections 254, 256 are manufactured from tungsten or a tungsten alloy. The location and material of manufacture of the projections 254, 256 provide additional shielding in the overall radial path of the gap 270 for 360 degrees about the axis A. Further, the inclusion of two projections provides shielding in the gap 270 at both the inner diameter and the outer diameter of the chopper wheel 241. Thus, the planar surface 258 of the chopper wheel 241 is bracketed such that x-ray energy scattered from the surface 258 is attenuated whether scattering radially inward or radially outward.

Figure 6:
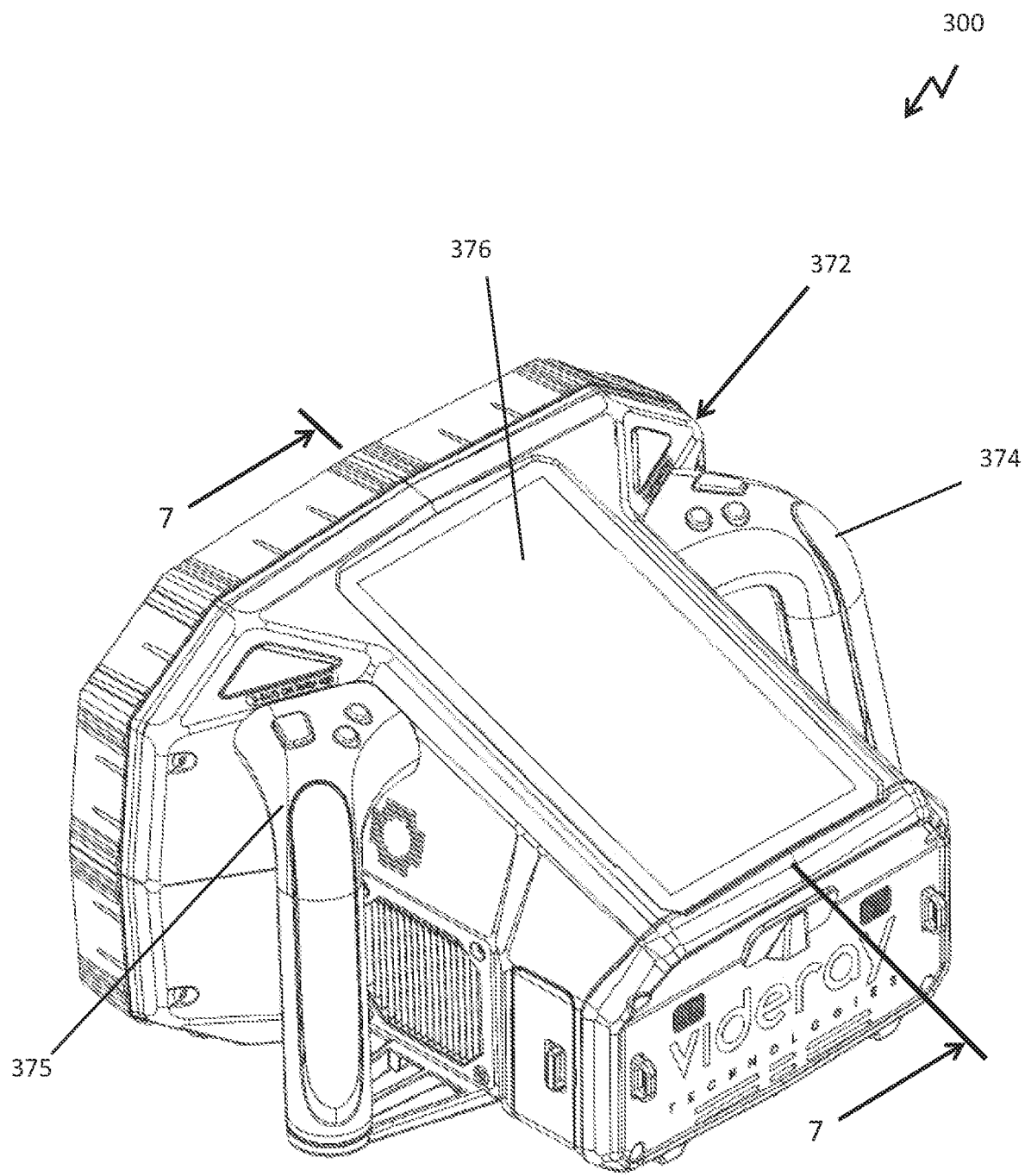
FIG. 6 illustrates a handheld backscatter x-ray imaging system in accordance with one embodiment.
Figure 7:
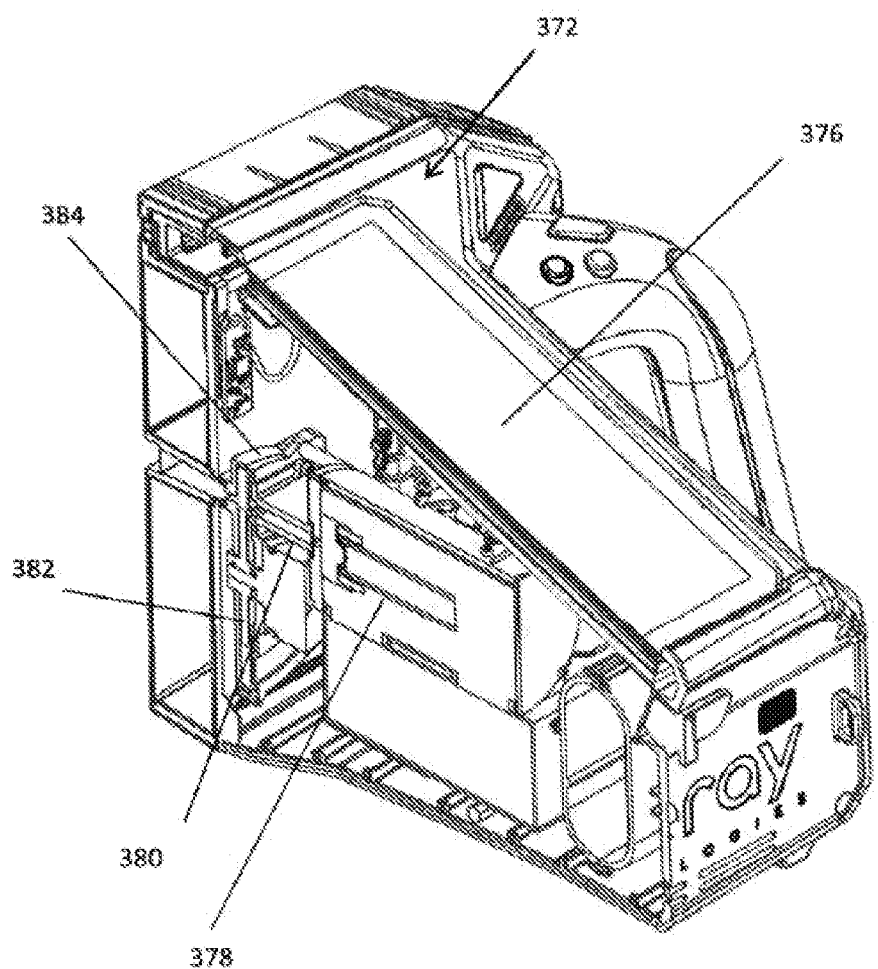
FIG. 7 illustrates a cross-sectional view of the handheld backscatter x-ray imaging system of FIG. 6 in accordance with one embodiment.

For example, in operation, x-ray energy scatters from the planar surface 258 of the chopper wheel 241. Some of the scattered energy travels substantially parallel to the planar surface 258, for example, in the region defining the gap 270. This x-ray energy travels unattenuated within the gap 270 in a radially outward direction until it strikes the outer projection 256. Similarly, some of the x-ray energy travels unattenuated within the gap 270 in a radially inward direction until it strikes the inner projection 254. Thus, the embodiments described herein provide a labyrinth design that adds structure in the chopper wheel to further attenuate x-ray energy. In combination with the grooves provided in the housing, scattered x-ray energy must pass through additional Referring now to FIG. 6, a handheld backscatter x-ray imaging system 300 includes an outer housing 372 with a plurality of handles including a first handle 374 and a second handle 375, a display screen 376 located in the outer housing 372 and viewable with the system held with the first handle 374 and the second handle 375. Referring to FIG. 7, elements enclosed within the outer housing include a source of x-ray energy 378 configured to generate an x-ray beam, a collimator 380 configured to narrow the x-ray beam, and a chopper wheel 382 having a surface configured to face in a direction of the collimator 380. According to one embodiment, the display screen 376 is configured to display an x-ray image. In various embodiments, the chopper wheel 382 is as shown and described herein with reference to FIGS. 1-5 and the chopper wheel 122, 241. Further, in various embodiments, the chopper wheel 382 is included in a chopper wheel assembly as shown and described herein with reference to FIGS. 1-5 and the chopper wheel assembly 100, 200. According to a further embodiment, the chopper wheel 382 includes a central axis, a plurality of slits extending through the chopper wheel in radially-outward direction relative to the central axis, a first projection extending from the surface in a direction of the collimator, the first projection located radially outward of the plurality of slits and provided for 360 degrees about the central axis and a second projection extending from the planar surface in the direction of the collimator, the second projection located radially inward of the plurality of slits and provided for 360 degrees about the central axis. According to an alternate embodiment, the handheld backscatter x-ray imaging system includes an outer housing that only provides a single handle, for example, in an outer enclosure with a shape similar to a radar gun.

Although the preceding is described in the context of a handheld instrument, those of ordinary skill in the art will understand in view of the disclosure herein that the embodiments of the chopper wheel and chopper wheel housing can be employed in any of a variety of x-ray instruments regardless of size and portability. For example, a chopper wheel assembly including a chopper wheel with projections 254, 256 and a housing including grooves 262, 264 can be included in large x-ray instruments that are designed for service at fixed locations or on movable platforms.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A chopper wheel assembly configured for use with a source of x-ray energy, the chopper wheel assembly comprising:

a collimator configured to narrow an x-ray beam generated by the source of x-ray energy;

a chopper wheel having a planar surface configured to face in a direction of the collimator, a central axis, a plurality of slits in the planar surface, the plurality of slits extending in a radially-outward direction relative to the central axis, a first projection extending from the planar surface in a direction of the collimator, the first projection located radially-outward of the plurality of slits and provided for 360 degrees about the central axis, and a second projection extending from the planar surface in the direction of the collimator, the second projection located radially inward of the plurality of slits and provided for 360 degrees about the central axis; and a housing including a hollow interior region configured to receive the chopper wheel, the housing including an interior wall facing toward the chopper wheel and away from the direction of the collimator, the interior wall including a first groove configured to receive the first projection and a second groove configured to receive the second projection with the chopper wheel received within the hollow interior region.

2. The chopper wheel assembly of claim 1, wherein the housing is manufactured from a material having a lower atomic number than tungsten.

3. The chopper wheel assembly of claim 1, wherein the housing includes brass.

4. The chopper wheel assembly of claim 1, wherein the interior wall includes a substantially planar region in which the first groove and the second groove are located.

5. The chopper wheel assembly of claim 1, wherein the first projection defines an outer rim of the chopper wheel, and wherein the second projection defines an inner rim of the chopper wheel.

6. The chopper wheel assembly of claim 5, further comprising a motor and a chopper wheel hub configured to couple to the motor, wherein the chopper wheel defines a central opening, and
wherein the chopper wheel hub is configured to secure within the central opening.

7. The chopper wheel assembly of claim 5, wherein the interior wall includes a substantially planar region in which the first groove and the second groove are located.

8. A handheld backscatter x-ray imaging system, comprising:

an outer housing including a plurality of handles;
a display screen located in the outer housing and viewable with the handheld backscatter x-ray imaging system held with the plurality of handles, the display screen configured to display an x-ray image;
a source of x-ray energy configured to generate an x-ray beam, the source of x-ray energy located within the outer housing;
a collimator configured to narrow the x-ray beam; and
a chopper wheel having a planar surface configured to face in a direction of the collimator, a central axis, a plurality of slits extending through the chopper wheel in a radially-outward direction relative to the central axis, a first projection extending from the planar surface in a direction of the collimator, the first projection located radially outward of the plurality of slits and provided for 360 degrees about the central axis, and a second projection extending from the planar surface in the direction of the collimator, the second projection located radially inward of the plurality of slits and provided for 360 degrees about the central axis.

9. The handheld backscatter x-ray imaging system of claim 8, further comprising a chopper wheel housing located within the outer housing and configured to enclose the chopper wheel, wherein the chopper wheel housing is manufactured from materials having lower atomic numbers, respectively, than tungsten.

10. The handheld backscatter x-ray imaging system of claim 9, wherein the chopper wheel housing includes brass.

11. The handheld backscatter x-ray imaging system of claim 9, wherein the chopper wheel housing includes a hollow interior region configured to receive the chopper wheel, the chopper wheel housing including an interior wall facing toward the chopper wheel and away from the direction of the collimator, the interior wall including a first groove configured to receive the first projection and a second groove configured to receive the second projection with the chopper wheel received within the hollow interior region.

12. The handheld backscatter x-ray imaging system of claim 11, wherein the interior wall includes a substantially planar region in which the first groove and the second groove are located.

13. The handheld backscatter x-ray imaging system of claim 8, wherein the first projection defines an outer rim of the chopper wheel, and wherein the second projection defines an inner rim of the chopper wheel.

14. The handheld backscatter x-ray imaging system of claim 8, further comprising a motor and a chopper wheel hub configured to couple to the motor, wherein the chopper wheel defines a central opening, and wherein the chopper wheel hub is configured to secure within the central opening.

15. A method of attenuating x-ray energy generated during an operation of a backscatter imaging system configured to generate a collimated beam of x-ray energy, the method comprising:

providing a chopper wheel including an inner rim and an outer rim, the chopper wheel configured to rotate in a plane to periodically interrupt the collimated beam of x-ray energy directed substantially perpendicular to the plane, an interruption generating scattered x-ray energy in directions including a direction substantially parallel to the plane of the chopper wheel;

enclosing the chopper wheel in a housing with a gap between the chopper wheel and an interior surface of the housing, the gap substantially parallel to the plane of the chopper wheel;

including a first projection at the outer rim of the chopper wheel, the first projection extending into the gap in a direction perpendicular to the plane; and including a second projection at the inner rim of the chopper wheel, the second projection extending into the gap in the direction perpendicular to the plane.

16. The method of claim 15, further comprising:

including a first groove in the interior surface of the housing, the first groove configured to receive the first projection with the chopper wheel rotating in the plane; and including a second groove in the interior surface of the housing, the second groove configured to receive the second projection with the chopper wheel rotating in the plane.

17. The method of claim 16, wherein the chopper wheel includes a central axis, wherein the method further includes:

locating the first projection for 360 degrees about the central axis; and locating the second projection for 360 degrees about the central axis.

\* \* \* \* \*